US009556765B2

(12) United States Patent
Ono

(10) Patent No.: US 9,556,765 B2
(45) Date of Patent: Jan. 31, 2017

(54) HYDRAULIC OIL SUPPLY APPARATUS

(71) Applicant: AISIN SEIKI KABUSHIKI KAISHA, Kariya-shi, Aichi (JP)

(72) Inventor: Hisashi Ono, Okazaki (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 14/443,229

(22) PCT Filed: Sep. 20, 2013

(86) PCT No.: PCT/JP2013/075512
§ 371 (c)(1),
(2) Date: May 15, 2015

(87) PCT Pub. No.: WO2014/080686
PCT Pub. Date: May 30, 2014

(65) Prior Publication Data
US 2015/0300219 A1  Oct. 22, 2015

(30) Foreign Application Priority Data

Nov. 20, 2012 (JP) .................................. 2012-254432

(51) Int. Cl.
*F01M 1/16* (2006.01)
*F16K 17/04* (2006.01)
*F01L 1/344* (2006.01)

(52) U.S. Cl.
CPC ................ *F01M 1/16* (2013.01); *F16K 17/04* (2013.01); *F16K 17/0473* (2013.01); *F01L 2001/34423* (2013.01)

(58) Field of Classification Search
CPC .. F01L 2001/34423; F01M 1/16; F16K 17/04; F16K 17/0473; F16H 57/0435; Y10T 137/86107; Y10T 137/87249
(Continued)

(56) References Cited

U.S. PATENT DOCUMENTS 4,680,928 A * 7/1987 Nishikawa ............ F15B 21/042
192/3.28
4,768,632 A * 9/1988 Moan .................... B60W 30/18
192/3.29
(Continued)

FOREIGN PATENT DOCUMENTS

DE 40 24 056 C1 9/1991
JP 06-212932 A 8/1994
(Continued)

OTHER PUBLICATIONS

International Preliminary Report on Patentability and Written Opinion of the International Searching Authority (Forms PCT/IB373 and PCT/ISA/237) issued on Jun. 4, 2015, by the International Bureau of WIPO, in corresponding International Application No. PCT/JP2013/075512. (6 pages).
(Continued)

*Primary Examiner* — William McCalister
(74) *Attorney, Agent, or Firm* — Buchanan Ingersoll & Rooney PC

(57) ABSTRACT

A hydraulic oil supply apparatus includes an oil pump discharging hydraulic oil, a common oil passage through which the discharged hydraulic oil flows, a first oil passage branched from the common oil passage to supply the hydraulic oil to a valve opening and closing timing control apparatus, a second oil passage supplying the hydraulic oil to a main gallery, and a flow control valve decreasing a volume of hydraulic oil flowing through the first oil passage with an increase of hydraulic pressure of the hydraulic oil discharged from the oil pump so as to increase a volume of hydraulic oil flowing through the second oil passage. In the hydraulic oil supply apparatus, hydraulic pressure generated from the hydraulic oil passing through a valve body of the flow control valve is applied to the valve body as a force (Continued)

against a force of a biasing member that biases the valve body.

6 Claims, 4 Drawing Sheets

(58) Field of Classification Search
USPC .......................................... 137/565.26, 597
See application file for complete search history.

(56) References Cited

U.S. PATENT DOCUMENTS

| | | | | |
|---|---|---|---|---|
| 5,058,716 | A * | 10/1991 | Lippe | F16H 61/143 192/3.3 |
| 5,170,756 | A | 12/1992 | Szodfridt | |
| 5,417,315 | A * | 5/1995 | Fukunaga | F16H 61/14 192/3.29 |
| 5,513,732 | A * | 5/1996 | Goates | F16H 61/143 192/3.3 |
| 5,701,982 | A * | 12/1997 | Nakatani | F16H 61/143 192/3.3 |
| 5,890,509 | A * | 4/1999 | Becker | F15B 21/045 137/115.26 |
| 6,044,645 | A * | 4/2000 | Greenan | F16H 57/0412 60/337 |
| 6,056,094 | A * | 5/2000 | Sakai | F16H 57/04 192/3.3 |
| 6,068,569 | A * | 5/2000 | Redinger | F16H 57/0413 475/159 |
| 6,666,225 | B2 * | 12/2003 | Kemmner | F16H 57/04 137/14 |
| 6,695,737 | B2 * | 2/2004 | Park | F16H 57/04 137/625.64 |
| 7,243,767 | B2 * | 7/2007 | Gierer | F16H 57/0413 192/113.1 |
| 7,338,402 | B2 * | 3/2008 | Bucher | F16H 61/0246 475/120 |
| 7,677,373 | B2 * | 3/2010 | Bedert | F16H 61/143 192/3.29 |
| 8,327,884 | B2 * | 12/2012 | Nishimine | F16H 61/0021 137/111 |
| 2009/0311115 | A1 | 12/2009 | Ono et al. | |
| 2011/0067667 | A1 | 3/2011 | Miyachi et al. | |
| 2011/0067668 | A1 | 3/2011 | Miyachi et al. | |
| 2012/0261009 | A1 | 10/2012 | Miyachi et al. | |
| 2013/0139916 | A1 | 6/2013 | Miyachi | |

FOREIGN PATENT DOCUMENTS

| | | |
|---|---|---|
| JP | 2002-303111 A | 10/2002 |
| JP | 2004-143972 A | 5/2004 |
| JP | 2009-299573 A | 12/2009 |
| JP | 2012-007543 A | 1/2012 |
| JP | 2012-219806 A | 11/2012 |
| JP | 2013-092088 A | 5/2013 |
| JP | 2013-100736 A | 5/2013 |
| JP | 2013-100737 A | 5/2013 |
| WO | WO 2012/032813 A1 | 3/2012 |

OTHER PUBLICATIONS

International Search Report (PCT/ISA/210) mailed on Dec. 3, 2013, by the Japanese Patent Office as the International Searching Authority for International Application No. PCT/JP2013/075512.
Written Opinion (PCT/ISA/237) mailed on Japanese, by the Japanese Patent Office as the International Searching Authority for International Application No. PCT/JP2013/075512.

* cited by examiner

HYDRAULIC OIL SUPPLY APPARATUS

TECHNICAL FIELD

This invention relates to a hydraulic oil supply apparatus supplying hydraulic oil discharged from an oil pump to an engine and other portions.

BACKGROUND ART

Conventionally, in a vehicle, hydraulic oil is used to lubricate and cool an inner portion of an engine and to control an apparatus that is controlled by hydraulic pressure, for example, a valve opening and closing timing control apparatus. A hydraulic oil supply apparatus is employed to supply the hydraulic oil to the inner portion of the engine and the valve opening and closing timing control apparatus, for example. The hydraulic oil is stored at an oil pan when the engine is stopped. When the engine is operated, an oil pump constituting the hydraulic oil supply apparatus is driven. The hydraulic oil in the oil pan is suctioned by the oil pump and discharged to be supplied to the inner portion of the engine and the valve opening and closing timing control apparatus, for example. Because the volume of necessary hydraulic oil for the inner portion of the engine and the valve opening and closing timing control apparatus, for example, changes depending on the number of rotations of the engine, the hydraulic oil supply apparatus may include a configuration that may change the volume of hydraulic oil supplied to the inner portion of the engine or the valve opening and closing timing control apparatus, for example, depending on the number of rotations of the engine. Such the hydraulic oil supply apparatus is described in the following Patent Document 1.

An oil supply apparatus for a vehicle disclosed in Patent Document 1 is configured to include an oil pump driven by a rotation of an engine to discharge oil, a hydraulic actuator (valve opening and closing timing control apparatus) operated by the hydraulic pressure of oil discharged from the oil pump, and an engine lubrication apparatus lubricating each member of the engine by the hydraulic pressure of oil discharged from the oil pump. The oil supply apparatus for the vehicle includes a variable pressurizing valve that restricts a flow volume of oil to the engine lubrication apparatus from the oil pump in a case where the hydraulic pressure is low so as to prioritize oil supply to the hydraulic actuator from the oil pump.

DOCUMENT OF PRIOR ART

Patent Document

Patent Document 1: JP2009-299573A

OVERVIEW OF INVENTION

Problem to be Solved by Invention

In the oil supply apparatus for the vehicle in Patent Document 1, in a case where the hydraulic pressure of oil supplied by the oil pump is equal to or smaller than a predetermined value, i.e., the number of rotations of the engine is equal to or smaller than a predetermined value, the oil supply from the oil pump to the engine lubrication apparatus is restrained by the variable pressurizing valve to thereby prioritize the oil supply to the hydraulic actuator, which may easily secure the hydraulic pressure applied to the hydraulic actuator. Therefore, even in a case where the number of rotations of the oil pump is small, the hydraulic pressure applied to the hydraulic actuator is preferentially secured. Without an electrically-driven oil pump for assisting the oil pump, the hydraulic actuator may be appropriately operated.

The hydraulic actuator requires a large volume of oil supply at a low revolution of the engine immediately after the engine start, however, the hydraulic actuator does not require a large volume of oil supply afterwards when the number of rotations of the engine increases. On the other hand, the engine lubrication apparatus requires a larger volume of oil supply with the increase of the number of rotations of the engine. Nevertheless, in the oil supply apparatus for the vehicle in Patent Document 1, after the variable pressurizing valve is brought to a fully open state, the volume of oil in proportion to the number of rotations of the engine is supplied not only to the engine lubrication apparatus but also to the hydraulic actuator. Accordingly, oil beyond necessity is supplied to the hydraulic actuator so as to supply the oil necessary to the engine lubrication apparatus. In order to secure the oil supply to the engine lubrication apparatus, the oil pump with a large capacity is required. Therefore, not only a cost increase, a weight increase, and an increase of occupied space of the oil pump occurs but also drive loss of the oil pump increases to thereby deteriorate fuel consumption.

In view of the aforementioned drawback, the present invention has an object to provide a downsized hydraulic oil supply apparatus where a downsized oil pump that decreases drive loss and restrains deterioration of fuel consumption is applicable.

Means for Solving Problem

In order to achieve the aforementioned object, the hydraulic oil supply apparatus according to the present invention is characterized to include an oil pump driven by a rotation of an engine to discharge a hydraulic oil, a common oil passage through which the hydraulic oil discharged from the oil pump flows, a branch point at which an end portion of the common oil passage is branched into two oil passages, a first oil passage extending from the branch point, the first oil passage through which a portion of the hydraulic oil flowing through the common oil passage flows to be supplied to a first portion, a second oil passage extending from the branch point, the second oil passage through which the rest of the hydraulic oil flowing through the common oil passage flows to be supplied to a second portion different from the first portion, and a first flow control valve provided at a portion of the first oil passage and configured to include a first valve body changing a volume of the hydraulic oil flowing through the first oil passage and a first biasing member applying a biasing force to the first valve body, the first flow control valve being operated to decrease a flow area of the hydraulic oil flowing through the first oil passage as a hydraulic pressure of the hydraulic oil discharged from the oil pump increases, and is characterized in that the volume of the hydraulic oil flowing through the first oil passage is reduced by an application of a hydraulic pressure generated from the hydraulic oil passing through the first valve body as a force to move the first valve body against the biasing force of the first biasing member.

According to the aforementioned feature, the first valve body moves by the increase of the hydraulic pressure of the hydraulic oil in association with the increase of the number of rotations of the engine to thereby reduce the volume of the hydraulic oil flowing through the first oil passage. Thus, in a case where the number of rotations of the engine is small including a case immediately after the engine start, the hydraulic oil may be preferentially supplied to the first portion that requires a large volume of the hydraulic oil. Then, after the number of rotations of the engine increases so that the sufficient hydraulic oil is supplied to the first portion, the volume of hydraulic oil supplied to the first portion may be limited. Accordingly, drive loss of the oil pump may be reduced and deterioration of fuel consumption may be restrained. As a result, the oil pump with a small capacity is usable, which is effective in view of cost, weight, and occupied space.

In addition, the first valve body is configured to move by the hydraulic pressure generated from the hydraulic oil passing through the first valve body. Thus, the movement of the first valve body is stopped at a portion where the hydraulic pressure of the hydraulic oil passing through the first valve body and the hydraulic pressure applied to the first valve body are balanced out. Accordingly, even when the number of rotations of the engine increases, the first valve body is inhibited from being brought to a closed state. A predetermined volume of the hydraulic oil is continuously supplied to the first portion.

The hydraulic oil supply apparatus according to the present invention is desirable to further include a second flow control valve provided at a portion of the second oil passage and configured to include a second valve body changing a volume of the hydraulic oil flowing through the second oil passage and a second biasing member applying a biasing force to the second valve body, the second flow control valve being operated to increase the volume of the hydraulic oil flowing through the second oil passage as the hydraulic pressure of the hydraulic oil discharged from the oil pump increases.

According to the aforementioned construction, a large volume of the hydraulic oil is inhibited from being supplied to the second portion in a case where the number of rotations of the engine is small, and a large volume of the hydraulic oil is supplied to the second portion in a case where the number of rotations of the engine increases. Accordingly, because the volume of the hydraulic oil necessary to the first portion and the volume of the hydraulic oil necessary to the second portion relative to the increase of the number of rotations of the engine contradict each other, the oil pump with a small capacity is capable of supplying the hydraulic oil necessary to the first portion and the second portion with any number of rotations of the engine. As a result, the drive loss of the oil pump may be reduced and the deterioration of fuel consumption may be restrained, which is effective in view of cost, weight, and occupied space.

The hydraulic oil supply apparatus according to the present invention is desirable to include a flow control valve in which the first flow control valve and the second flow control valve are integrated by an integration of the first valve body and the second valve body to constitute a valve body and a sharing of the first biasing member and the second biasing member to constitute a biasing member.

According to the aforementioned construction, as compared to a case where the first flow control valve and the second flow control valve are manufactured separately, commonalization of components may be conducted. Thus, the number of components of the flow control valve as a whole may be reduced and a total volume may decrease. Accordingly, the hydraulic oil supply apparatus may be provided at a reduced cost and occupied space upon mounting may be reduced.

The hydraulic oil supply apparatus according to the present invention is desirable to further include a supply oil passage connecting the first oil passage at a downstream side relative to the first valve body and a top portion of the first valve body, and a portion of the hydraulic oil passing through the first valve body flows through the supply oil passage to be supplied to the top portion.

According to the aforementioned construction, the portion of the hydraulic oil securely flows through the supply oil passage and therefore the hydraulic pressure of the hydraulic oil passing through the first valve body may be applied to the top portion of the first valve body.

The hydraulic oil supply apparatus according to the present invention is desirable to further include a housing including an inner void within which the first valve body and the first biasing member are inserted t, and a groove formed at an inner wall surface of the inner void and connecting the first oil passage and the top portion of the first valve body, and a portion of the hydraulic oil passing through the first valve body flows through the groove to be supplied to the top portion.

According to the aforementioned construction, the portion of the hydraulic oil may be supplied to the top portion of the first valve body by a simple additional processing of the groove at the same time the inner void of the housing is processed. Accordingly, the hydraulic oil supply apparatus may be provided at a reduced cost.

MODE FOR CARRYING OUT THE INVENTION

1. First Embodiment

Construction of Hydraulic Oil Supply Apparatus

Figure 1:
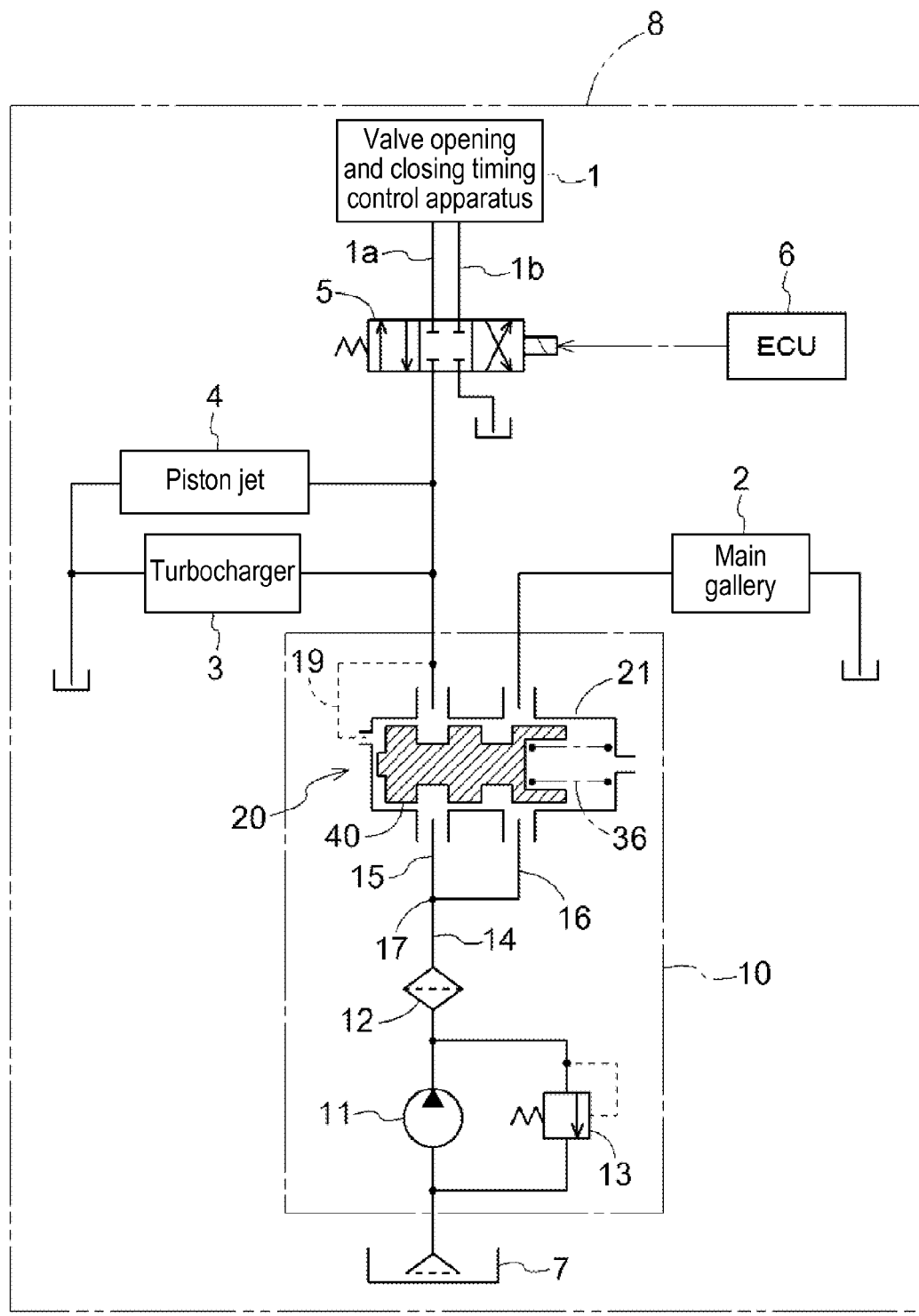
FIG. 1 is a block diagram schematically illustrating constructions of a hydraulic oil supply apparatus and hydraulic oil supply destinations according to a first embodiment.

In the following, an embodiment of the present invention is explained in detail with reference to drawings. FIG. 1 is a block diagram schematically illustrating constructions of a hydraulic oil supply apparatus 10 according to the first embodiment and supply destinations of hydraulic oil by the hydraulic oil supply apparatus 10. As illustrated in FIG. 1, the hydraulic oil supply apparatus 10 includes an oil pump 11, an oil filter 12, a relief valve 13, a common oil passage 14, a first oil passage 15, a second oil passage 16 and a flow control valve 20.

FIG. 1 illustrates, in addition to the hydraulic oil supply apparatus 10, a valve opening and closing timing control apparatus 1, a turbocharger 3, a piston jet 4, an oil control valve 5 switching the supply destination of the hydraulic oil at the valve opening and closing timing control apparatus 1, an ECU (engine control unit) 6 controlling the switching of the oil control valve 5, an oil pan 7 storing the hydraulic oil, and a main gallery 2 supplied with the hydraulic oil that flows through the second oil passage 16, all of which constitute an engine 8. The valve opening and closing timing control apparatus 1, the turbocharger 3, and the piston jet 4 serve as an example of a first portion while the main gallery 2 serves as an example of a second portion.

The oil pump 11 suctions and pressurizes the hydraulic oil from the oil pan 7 and discharges the hydraulic oil to the common oil passage 14. The resulting discharge pressure causes the hydraulic oil to flow through the common oil passage 14. A rotation shaft of the oil pump 11 is connected and fixed to a crankshaft (not shown) of the engine 8 so as to be mechanically driven by a rotation driving force of the crankshaft. The oil filter 12 is provided at a portion of the common oil passage 14 so that small dust or sludge in the hydraulic oil that has not been filtered at an oil strainer is filtered at the oil filter 12. The relief valve 13 is opened in a case where the discharge pressure of the hydraulic oil from the oil pump 11 exceeds a predetermined value so that the hydraulic oil equal to or greater than a predetermined pressure value is inhibited from flowing through the common oil passage 14.

An end portion of the common oil passage 14 is branched at a branch point 17 from which the first oil passage 15 and the second oil passage 16 extend. The hydraulic oil flowing through the first oil passage 15 and the second oil passage 16 flows to the flow control valve 20. The flow control valve 20 is provided to change a distribution ratio of the hydraulic oil flowing through the common oil passage 14 to the first oil passage 15 and the second oil passage 16 depending on the number of rotations of the oil pump 11. Details of the flow control valve 20 are described later.

The first oil passage 15 passing through the flow control valve 20 is thereafter further branched to supply the hydraulic oil to each of the valve opening and closing timing control apparatus 1, the turbocharger 3, and the piston jet 4. Constructions and operations of the valve opening and closing timing control apparatus 1, the turbocharger 3, and the piston jet 4 are known and thus detailed explanation is omitted. In the present embodiment, as the first portion, the valve opening and closing timing control apparatus 1, the turbocharger 3, and the piston jet 4 are provided, however, the first portion is not limited thereto. In addition, not all of the valve opening and closing timing control apparatus 1, the turbocharger 3, and the piston jet 4 are necessarily provided at one vehicle. At least one of the valve opening and closing timing control apparatus 1, the turbocharger 3, and the piston jet 4 may be configured to be provided.

The oil control valve 5 is provided at an end portion of the first oil passage 15 facing the valve opening and closing timing control apparatus 1. The oil control valve 5, which is an electromagnetically-controlled type, can control supply, discharge, and interruption of supply and discharge of the hydraulic oil relative to an advanced angle oil passage 1a and a retarded angle oil passage 1b of the valve opening and closing timing control apparatus 1. The oil control valve 5 is configured in a spool type so as to operate by changing a position of a spool connected to a solenoid which is driven on a basis of a control of power supply volume by the ECU 6. Specifically, by switching the position of the spool, a switchover is controllable among three operations consisting of the oil supply to the advanced angle oil passage 1a and the hydraulic oil discharge from the retarded angle oil passage 1b, the hydraulic oil discharge from the advanced angle oil passage 1a and the hydraulic oil supply to the retarded angle oil passage 1b, and the interruption of supply and discharge of the hydraulic oil relative to the advanced angle oil passage 1a and the retarded angle oil passage 1b.

The second oil passage 16 passing through the flow control valve 20 supplies the hydraulic oil to the main gallery 2. The main gallery 2 includes entire sliding members such as a piston, a cylinder, a bearing of a crankshaft, and the like which are not illustrated. The aforementioned members operate at high speed in association with the increase of revolution of the engine 8. Thus, as the revolution of the engine 8 becomes high, a large volume of hydraulic oil is required for cooling and lubrication. In addition, the main gallery 2 includes other apparatuses provided at the vehicle and driven by the hydraulic pressure.

[Construction of Flow Control Valve]

Figure 2:
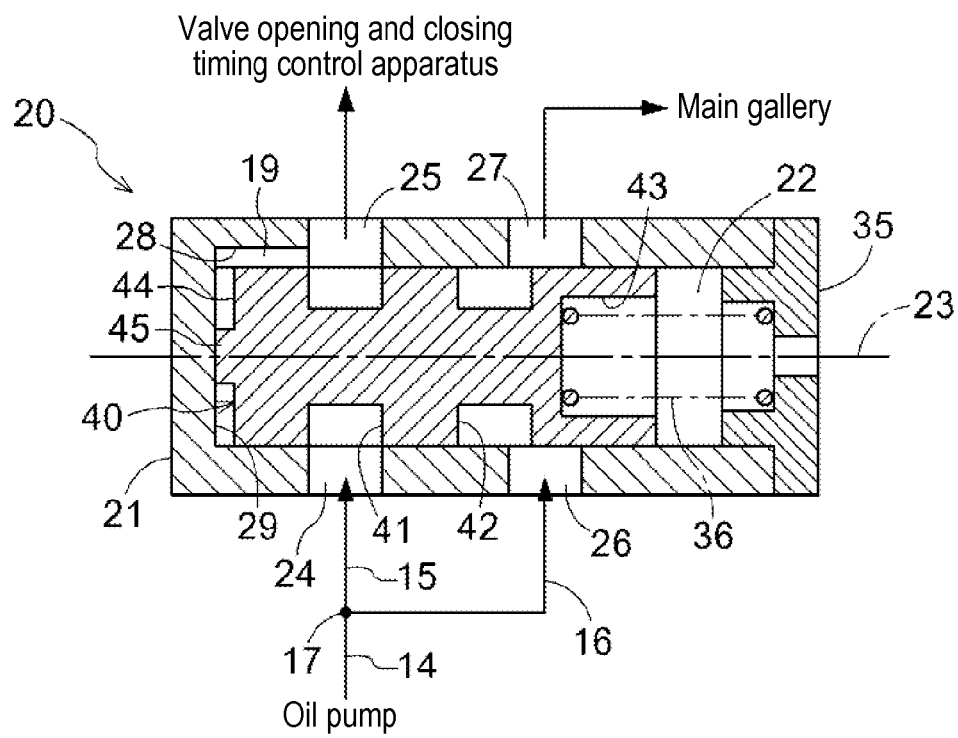
FIG. 2 is a longitudinal section view illustrating an initial state of a flow control valve.
Figure 3:
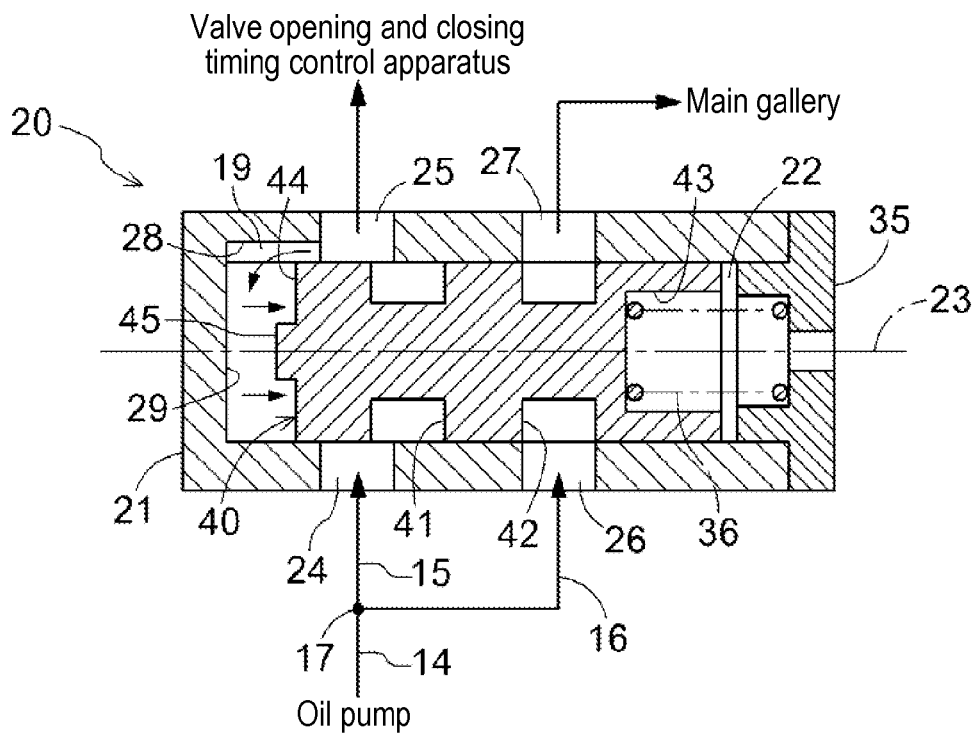
FIG. 3 is a longitudinal section view illustrating a final state of the flow control valve.

Next, the flow control valve 20 is explained in detail. FIGS. 2 and 3 are longitudinal section views each of which illustrates a construction of the flow control valve 20. The flow control valve 20 is configured to include a housing 21, a cap 35, a biasing member 36, and a valve body 40. The housing 21 includes a cylindrical configuration with a bottom and an opening at one side (right side in FIG. 2). An inner void 22 provided at an inner side of the housing 21 is in a column form. The valve body 40 and the biasing member 36 are arranged at the inner void 22 and an opening side of the housing 21 is closed by the cap 35. A first inflow bore 24, a first outflow bore 25, a second inflow bore 26, and a second outflow bore 27 are opened in the housing 21 so as to penetrate radially inwardly from an outer periphery of the housing 21 to the inner void 22. The first inflow bore 24 and the first outflow bore 25 are connected to the first oil passage 15 while the second inflow bore 26 and the second outflow bore 27 are connected to the second oil passage 16. In addition, a groove 28 is formed at an inner peripheral surface of the housing 21 to extend from the first outflow bore 25 to a bottom surface 29 along a direction of an axial center 23 of the inner void 22.

The valve body 40 that is coaxial with the axial center 23 is arranged in a state where an outer peripheral surface of the valve body 40 is tightly in contact with the inner peripheral surface of the housing 21 and the valve body 40 is movable along the direction of the axial center 23. A surface of the valve body 40 that is opposed to the bottom surface 29 at the inner side of the housing 21 forms a top portion 44. A projection 45 is formed along the direction of the axial center 23 in the vicinity of a center of the top portion 44. The valve body 40 includes a first recess portion 41 in a groove form over an entire circumference radially inwardly from the outer peripheral surface of the valve body 40 at a predetermined distance from the top portion 44 along the direction of the axial center 23. In addition, the valve body 40 includes a second recess portion 42 in a groove form over the entire circumference radially inwardly from the outer peripheral surface of the valve body 40 at a further predetermined distance from the first recess portion 41 along the direction of the axial center 23.

A third recess portion 43 is formed along the direction of the axial center 23 from an end surface of the valve body 40 opposed to the cap 35 and formed radially outwardly from a center of the valve body 40. The first recess portion 41, the second recess portion 42, and the third recess portion 43 are independent from one another and are inhibited from connecting one another in the inner void 22. In the present embodiment, the groove depth and the groove width of the first recess portion 41 and the groove depth and the groove width of the second recess portion 42 are the same as one another, however, may be different from one another. In addition, the widths of the first recess portion 41, the first inflow bore 24, and the first outflow bore 25 in the direction of the axial center 23 are the same as one another, however, may be different from one another. The widths of the second recess portion 42, the second inflow bore 26, and the second outflow bore 27 in the direction of the axial center 23 are also the same as one another, however, may be also different from one another.

The cap 35 includes a configuration where a cylindrical portion is coaxially and integrally formed, in a standing manner, at a circular plate including an open bore at a center. An outer diameter of the circular plate is equal to an outer diameter of the housing 21. An outer periphery of the cylindrical portion is in close contact with the inner peripheral surface of the housing 21. A bore opened at a center of the plate in a discoid form functions to release a back pressure so that the valve body 40 smoothly moves in the direction of the axial center 23.

The biasing member 36 supported by a bottom surface of the third recess portion 43 and the discoid plate of the cap 35 to bias the valve body 40 in the direction of the bottom surface 29 is disposed between the valve body 40 and the cap 35. The projection 45 of the valve body 40 is in contact with the bottom surface 29 by a biasing force of the biasing member 36. FIG. 2 illustrates the aforementioned state which is hereinafter referred to as an initial state. When the valve body 40 is in the initial state, the first inflow bore 24, the first outflow bore 25, and the first recess portion 41 are completely opposed to one another, which results in a completely open state. At this time, only portions of the entire second inflow bore 26, second outflow bore 27, and second recess portion 42 are opposed to one another, which results in a partially open state. Hereinafter, a portion constituted by the first inflow bore 24, the first outflow bore 25, and the first recess portion 41 of the flow control valve 20 is referred to as a first valve. A portion constituted by the second inflow bore 26, the second outflow bore 27, and the second recess portion 42 is referred to as a second valve. That is, in the initial state, the first valve is in the completely open state and the second valve is in the partially open state.

[Operation of Hydraulic Oil Supply Apparatus]

Figure 4:
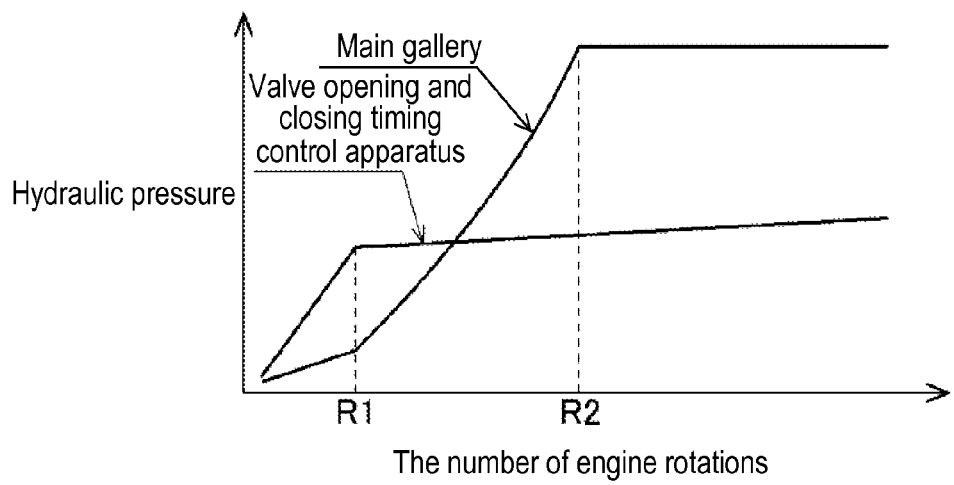
FIG. 4 is a graph illustrating hydraulic pressure of hydraulic oil supplied to a valve opening and closing timing control apparatus and hydraulic pressure of hydraulic oil supplied to a main gallery in a case where the number of rotations of an engine is changed.

Next, an operation of the hydraulic oil supply apparatus 10 is explained. FIG. 4 illustrates the hydraulic pressure of the hydraulic oil supplied to the valve opening and closing timing control apparatus 1 and the hydraulic pressure of the hydraulic oil supplied to the main gallery 2. In FIGS. 2 to 4, the term "valve opening and closing timing control apparatus" is indicated. The aforementioned term "valve opening and closing timing control apparatus" includes the turbocharger 3 and the piston jet 4. In a case where the oil pump 11 is driven in the initial state, as illustrated in FIG. 2, most of the hydraulic oil flowing through the common oil passage 14 flows through the first oil passage 15 and the first valve. The volume of hydraulic oil flowing through the second oil passage 16 and the second valve is small. In the aforementioned state, when the number of rotations of the engine 8, i.e., the number of rotations of the oil pump 11, increases, the hydraulic pressure of the hydraulic oil flowing through the first valve and supplied to the valve opening and closing timing control apparatus 1 greatly increases while the hydraulic pressure of the hydraulic oil flowing through the second valve and supplied to the main gallery 2 increases, however, a degree of increase thereof is small as compared to the hydraulic pressure of the hydraulic oil flowing through the first valve and supplied to the valve opening and closing timing control apparatus 1. The reason thereof is as follows.

Most of the hydraulic oil that flows through the first oil passage 15 to flow into the first inflow bore 24 to pass through the first recess portion 41 and that reaches the first outflow bore 25 flows through the first oil passage 15 to be supplied to the valve opening and closing timing control apparatus 1. At this time, a portion of the aforementioned hydraulic oil flows through the groove 28 to be supplied to a void constituted by the top portion 44 of the valve body 40 and the bottom surface 29. The hydraulic pressure of the supplied hydraulic oil is applied to the top portion 44 and a force is applied to the valve body 40 so that the valve body 40 moves along the direction of the axial center 23 against the biasing force of the biasing member 36. Because the hydraulic pressure applied to the top portion 44 increases as the number of rotations of the oil pump 11 increases, the valve body 40 moves in a rightward direction in FIG. 2 in a case where the force applied to the top portion 44 exceeds the biasing force of the biasing member 36. In a case where the valve body 40 moves, an area at which the first inflow bore 24, the first outflow bore 25, and the first recess portion 41 face one another decreases and a flow speed of the hydraulic oil supplied to the first valve increases in association with the increase of the number of rotations of the oil pump 11. Thus, the hydraulic pressure of the hydraulic oil supplied to the valve opening and closing timing control apparatus 1 greatly increases. In addition, when the valve body 40 moves, the flow speed of the hydraulic oil supplied to the second valve increases while an area at which the second inflow bore 26, the second outflow bore 27, and the second recess portion 42 face one another increases. The increase of the hydraulic pressure in association with the increase of the flow speed and the decrease of the hydraulic pressure in association with the increase of the facing area are balanced out, so that the increase of the hydraulic pressure of the hydraulic oil supplied to the main gallery 2 remains within a small degree. At the moment at which the valve body 40 starts moving, an increase ratio of the hydraulic pressure relative to the number of rotations of the engine changes, however, the change ratio is small and thus is not indicated in FIG. 4.

When the number of rotations of the oil pump 11 increases, the hydraulic pressure applied to the top portion 44 of the valve body 40 further increases. The area at which the first inflow bore 24, the first outflow bore 25, and the first recess portion 41 face one another decreases so that the hydraulic pressure of the hydraulic oil supplied to the valve opening and closing timing control apparatus 1 further increases. Nevertheless, how much the hydraulic pressure applied to the top portion 44 increases, the first valve is inhibited from being brought to the closed state. The reason is that the hydraulic oil that passes through the first recess portion 41 of the first valve is thereafter supplied to the top portion 44. On the other hand, the area at which the second inflow bore 26, the second outflow bore 27, and the second recess portion 42 face one another increases so that the hydraulic pressure of the hydraulic oil supplied to the main gallery 2 gently increases. In the end, the movement of the valve body 40 is stopped at a portion where the hydraulic pressure of the hydraulic oil passing through the valve body 40 and the hydraulic pressure applied to the top portion 44 are balanced out. The above corresponds to a state in which the number of rotations of the engine is R1 as indicated in FIG. 4. At this time, the flow control valve 20 is in a state as illustrated in FIG. 3. Hereinafter, the aforementioned state is referred to as a final state. In the final state, as illustrated in FIG. 3, the valve body 40 is configured so that the second inflow bore 26, the second outflow bore 27, and the second recess portion 42 completely face one another so that the second valve is in the completely open state. Accordingly, after the number of rotations of the engine reaches R1, the valve body 40 remains stopped even when the number of rotations of the engine increases. The hydraulic pressure of the hydraulic oil supplied to the valve opening and closing timing control apparatus 1 hardly increases while the hydraulic pressure of the hydraulic oil supplied to the main gallery 2 greatly increases. Then, when the number of rotations of the engine reaches R2 as indicated in FIG. 4, the relief valve 13 is opened so that the hydraulic pressure of the hydraulic oil supplied to the main gallery 2 is inhibited from increasing any more.

Accordingly, the flow control valve 20 is configured to preferentially supply the hydraulic oil to the valve opening and closing timing control apparatus 1 which requires a large volume of hydraulic oil in a case where the number of rotations of the engine 8 is small including a case immediately after the start thereof, and to supply a large volume of hydraulic oil to the main gallery 2 after the number of rotations of the engine 8 increases so that the sufficient hydraulic oil is supplied to the valve opening and closing timing control apparatus 1. Accordingly, because the oil pump 11 is inhibited from being driven beyond necessity, the drive loss of the oil pump 11 may be reduced and deterioration of fuel consumption may be restrained. As a result, the oil pump 11 with a small capacity is usable, which is effective in view of cost, weight, and occupied space.

According to the present embodiment, in the final state, the movement of the valve body 40 is stopped at the portion where the hydraulic pressure of the hydraulic oil passing through the valve body 40 and the hydraulic pressure applied to the top portion 44 are balanced out. In order to securely maintain the aforementioned state, the valve body 40 and the cap 35 are configured to make contact with each other when the final state is reached so that the valve body 40 is inhibited from further moving.

2. Second Embodiment

Construction of Flow Control Valve

Figure 5:
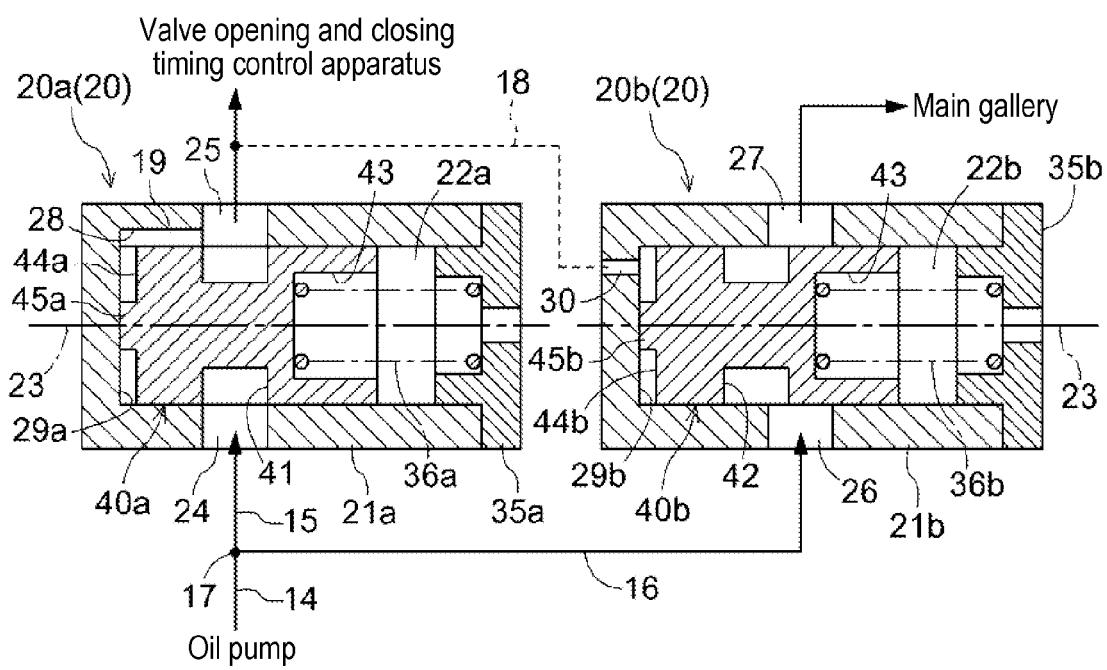
FIG. 5 is a longitudinal section view illustrating the initial state of a first flow control valve and a second flow control valve constituting the hydraulic oil supply apparatus according to a second embodiment.
Figure 6:
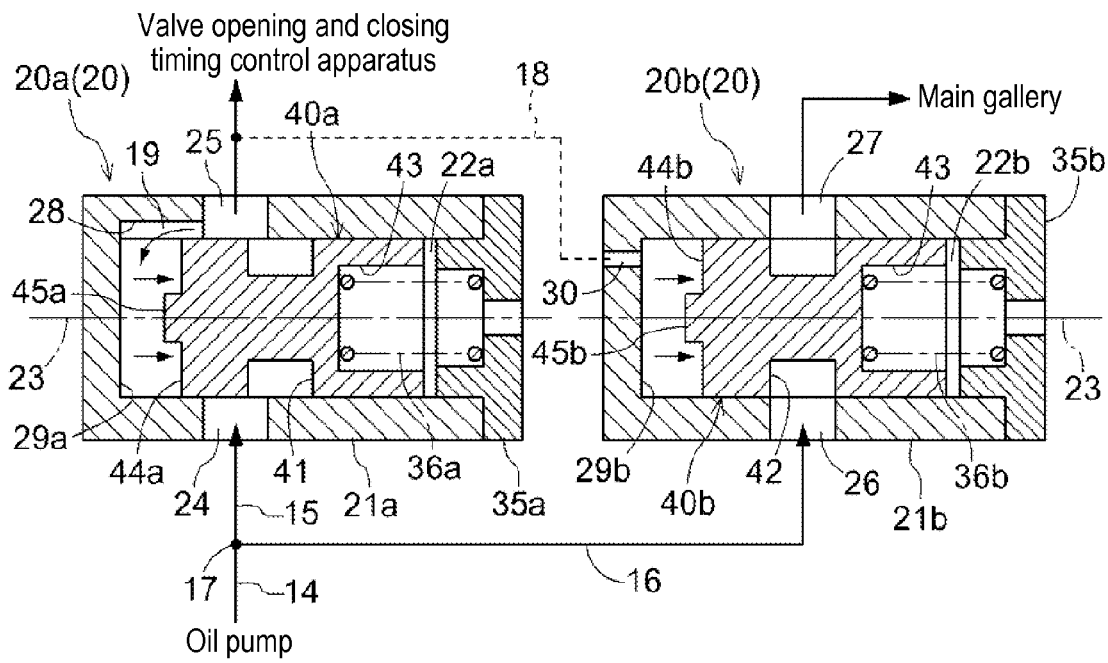
FIG. 6 is a longitudinal section view illustrating the final state of the first flow control valve and the second flow control valve.

Next, the hydraulic oil supply apparatus 10 according to the second embodiment is explained. In the present embodiment, a point where a portion constituting the first valve and a portion constituting the second valve in the flow control valve 20 are independent from each other is different from the first embodiment and the other construction is the same as the first embodiment. FIGS. 5 and 6 are longitudinal section views each of which illustrates a construction of the flow control valve 20 constituting the hydraulic oil supply apparatus 10 according to the present embodiment.

As illustrated in FIGS. 5 and 6, the flow control valve 20 in the present embodiment includes a first flow control valve 20a constituting the first valve and a second flow control valve 20b constituting the second valve. In the following explanation of the embodiment, the same constructive portions as the first embodiment bear the same reference numerals and an explanation related to the same construction is omitted. In addition, the same constructions as the first embodiment existing at both the first flow control valve 20a and the second flow control valve 20 bear the same reference numerals as the first embodiment suffixed by "a" and "b" respectively.

A first housing 21a of the first flow control valve 20a includes the first inflow bore 24, the first outflow bore 25, and the groove 28. A first valve body 40a of the first flow control valve 20a includes the first recess portion 41 and the third recess portion 43. Further, the first flow control valve 20a includes a first biasing member 36a biasing the first valve body 40a with a biasing force. A second housing 21b of the second flow control valve 20b includes the second inflow bore 26 and the second outflow bore 27. A second valve body 40b of the second flow control valve 20b includes the second recess portion 42 and the third recess portion 43. Further, the second flow control valve 20b includes a second biasing member 36b biasing the second valve body 40b with a biasing force. A penetration bore 30 is formed from an outer bottom surface of the second housing 21b to an inner void 22b so as to be connected to a third oil passage 18 that is branched from the first oil passage 15 at the downstream side of the first flow control valve 20a. Accordingly, the pressure of the hydraulic oil flowing through the first oil passage 15 may be applied to a second top portion 44b of the second valve body 40b via the third oil passage 18.

[Operation of Hydraulic Oil Supply Apparatus]

Next, an operation of the hydraulic oil supply apparatus 10 in a case where the flow control valve 20 according to the present embodiment is employed is explained. In the hydraulic oil supply apparatus 10 according to the present embodiment, the hydraulic pressure of the hydraulic oil supplied to the valve opening and closing timing control apparatus 1 and the hydraulic pressure of the hydraulic oil supplied to the main gallery 2 in a case where the number of rotations of the engine 8 changes are the same as those indicated in FIG. 4. In a case where the oil pump 11 is driven in the initial state, as illustrated in FIG. 5, most of the hydraulic oil flowing through the common oil passage 14 flows through the first oil passage 15 and the first flow control valve 20a. The volume of hydraulic oil flowing through the second oil passage 16 and the second flow control valve 20b is small. From the aforementioned state, when the number of rotations of the engine 8, i.e., the number of rotations of the oil pump 11, increases, as illustrated in FIG. 4, the hydraulic pressure of the hydraulic oil flowing through the first flow control valve 20a and supplied to the valve opening and closing timing control apparatus 1 greatly increases while the hydraulic pressure of the hydraulic oil supplied to the main gallery 2 increases, however, a degree of increase thereof is smaller as compared to the hydraulic pressure of the hydraulic oil flowing through the first flow control valve 20a and supplied to the valve opening and closing timing control apparatus 1.

When the number of rotations of the oil pump 11 increases, the hydraulic pressure of the hydraulic oil flowing through the groove 28 and applied to the first top portion 44a of the first valve body 40a increases to move the first valve body 40a. As a result, the area at which the first inflow bore 24, the first outflow bore 25, and the first recess portion 41 face one another decreases so that the hydraulic pressure of the hydraulic oil supplied to the valve opening and closing timing control apparatus 1 increases. At this time, a portion of the hydraulic oil passing through the first flow control valve 20a flows through the third oil passage 18 to be supplied from the penetration bore 30 and acts on the second top portion 44b of the second valve body 40b. As a result, in the same way as the first embodiment, the area at which the second inflow bore 26, the second outflow bore 27, and the second recess portion 42 face one another increases so that the hydraulic pressure of the hydraulic oil supplied to the main gallery 2 gently increases. In the end, the first flow control valve 20a reaches the final state when the hydraulic pressure of the hydraulic oil passing through the first valve body 40a and the hydraulic pressure applied to the first top portion 44a are balanced out so that the movement of the first valve body 40a is stopped. The above corresponds to the state in which the number of rotations of the engine is R1 as indicated in FIG. 4. The state of the first flow control valve 20a at this time is illustrated in FIG. 6. As illustrated in FIG. 6, after the number of rotations of the engine reaches R1, the first valve body 40a remains stopped even when the number of rotations of the engine increases. The hydraulic pressure of the hydraulic oil supplied to the valve opening and closing timing control apparatus 1 hardly increases.

On the other hand, in the second flow control valve 20b, when the first flow control valve 20a reaches the final state, the hydraulic pressure applied to the second top portion 44b of the second valve body 40b does not increase. Thus, the movement of the second valve body 40b stops. At this time, the second flow control valve 20b is configured to be brought to the completely open state where the second inflow bore 26, the second outflow bore 27, and the second recess portion 42 completely face one another. Accordingly, as illustrated in FIG. 6, after the number of rotations of the engine reaches R1, the hydraulic pressure of the hydraulic oil supplied to the main gallery 2 greatly increases when the number of rotations of the engine increases. In a case where the number of rotations of the engine reaches R2 as indicated in FIG. 4, the relief valve 13 is opened so that the hydraulic pressure of the hydraulic oil supplied to the main gallery 2 is inhibited from increasing any more.

In the flow control valve 20 according to the present embodiment, the first flow control valve 20a and the second flow control valve 20b are separated and independent from each other. Thus, even in a case where the flow control valve 20 may be only arranged at a portion where the first oil passage 15 and the second oil passage 16 are separated from each other, each of the first flow control valve 20a and the second flow control valve 20b may be arranged. In addition, because each of the first flow control valve 20a and the second flow control valve 20b may be downsized as compared to the integrally-formed flow control valve 20, a degree of freedom regarding a place where the first flow control valve 20a and the second flow control valve 20b are arranged is enhanced. Further, because the first biasing member 36a and the second biasing member 36b serving as separate biasing members are employed at the first flow control valve 20a and the second flow control valve 20b, the respective operations of the first valve body 40a and the second valve body 40b may be separately specified, which may improve a degree of freedom regarding setting of the valve body operation.

In the present embodiment, in the final state, the movement of the first valve body 40a is stopped at a portion where the hydraulic pressure of the hydraulic oil passing through the first valve body 40a and the hydraulic pressure applied to the first top portion 44a are balanced out to thereby also stop the movement of the second valve body 40b. In order to securely maintain the aforementioned state, when the final state is reached, it may be configured that the first valve body 40a and a cap 35a make contact with each other, and at the same time the second valve body 40b and a cap 35b make contact with each other so that the first valve body 40a and the second valve body 40b are inhibited from moving any more.

3. Other Embodiment

Figure 7:
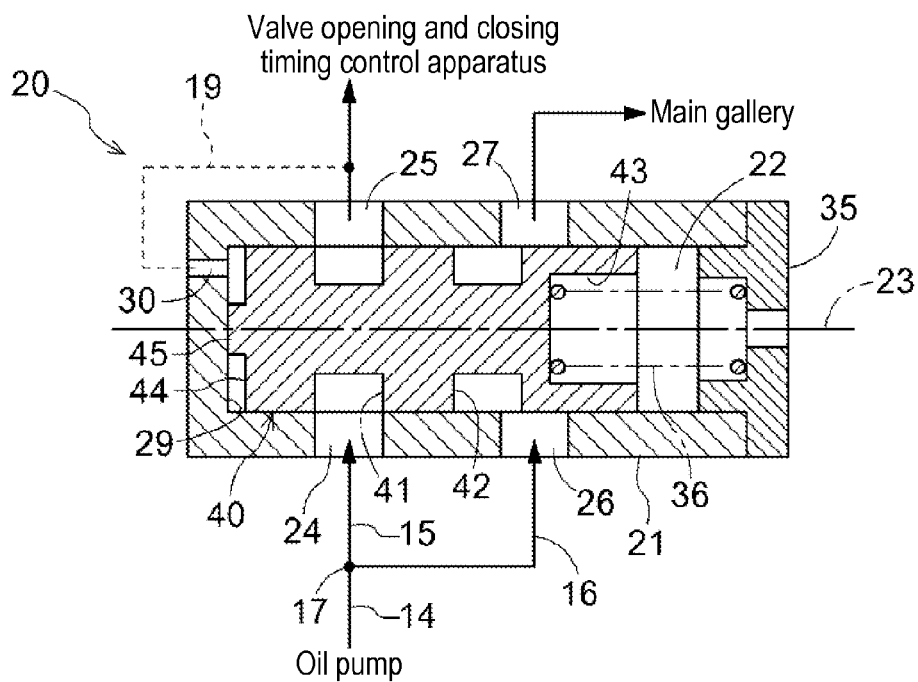
FIG. 7 is a longitudinal section view illustrating the initial state of the flow control valve constituting the hydraulic oil supply apparatus according to the other embodiment.

In the aforementioned first and second embodiments, the groove 28 is formed at the inner peripheral surface of the housing 21, 21a so that the hydraulic pressure of the hydraulic oil is applied to the valve body 40 or the first valve body 40a, however, the construction is not limited to the above. FIG. 7 is a longitudinal section view illustrating a construction of the flow control valve 20 constituting the hydraulic oil supply apparatus 10 according to the other embodiment. In the present embodiment, as illustrated in FIG. 7, the groove 28 is not formed at the inner peripheral surface of the housing 21. Instead, a supply oil passage 19 branched from the first oil passage 15 at the downstream side of the flow control valve 20 is formed to be connected to the penetration bore 30 that is formed at the housing 21. By the aforementioned supply oil passage 19, the hydraulic pressure of the hydraulic oil passing through the first valve may be applied to the top portion 44 of the valve body 40.

INDUSTRIAL AVAILABILITY

The present invention may be utilized as a hydraulic oil supply apparatus supplying hydraulic oil discharged form an oil pump to an engine and other portions.

EXPLANATION OF REFERENCE NUMERALS 1 valve opening and closing timing control apparatus (first portion)
2 main gallery (second portion)
3 turbocharger (first portion)
4 piston jet (first portion)
8 engine
11 oil pump
14 common oil passage
15 first oil passage
16 second oil passage
17 branch point
19 supply oil passage
20 flow control valve
20a first flow control valve (flow control valve)
20b second flow control valve (flow control valve)
28 groove
36 biasing member
36a first biasing member (biasing member)
36b second biasing member (biasing member)
40 valve body
40a first valve body (valve body)
40b second valve body (valve body)
44 top portion
44a top portion
44b top portion

The invention claimed is:
1. A hydraulic oil supply apparatus comprising:
an oil pump configured to be driven by a rotation of an engine to discharge a hydraulic oil;
a common oil passage through which the hydraulic oil discharged from the oil pump flows;
a branch point at which an end portion of the common oil passage is branched into two oil passages;
a first oil passage extending from the branch point, the first oil passage through which a portion of the hydrau- lic oil flowing through the common oil passage flows to be supplied to a first portion;

a second oil passage extending from the branch point, the second oil passage through which the rest of the hydraulic oil flowing through the common oil passage flows to be supplied to a second portion different from the first portion;

a first flow control valve provided at a portion of the first oil passage and including a first valve body changing a volume of the hydraulic oil flowing through the first oil passage and a first biasing member applying a biasing force to the first valve body, the first flow control valve being operated to decrease a flow area of the hydraulic oil flowing through the first oil passage and to increase a flow area of the hydraulic oil flowing through the second oil passage as a hydraulic pressure of the hydraulic oil discharged from the oil pump increases; and a housing including an inner void within which the first valve body and the first biasing member are inserted, wherein the volume of the hydraulic oil flowing through the first oil passage is reduced by an application of a hydraulic pressure generated from the hydraulic oil passing through the first valve body as a force to move the first valve body against the biasing force of the first biasing member, the first flow control valve comprises a first valve communicating with the first oil passage, and a second valve communicating with the second oil passage, the first valve includes a first inflow bore and a first outflow bore, which are formed in the housing, and a first recess portion formed in the first valve body, the second valve includes a second inflow bore and a second outflow bore, which are formed in the housing, and a second recess portion formed in the first valve body, and an area at which the second inflow bore, the second outflow bore, and the second recess portion face one another increases when hydraulic pressure of hydraulic oil discharged from the oil pump increases to move the first valve body.

2. The hydraulic oil supply apparatus according to claim 1, further comprising a supply oil passage connecting the first oil passage at a downstream side relative to the first valve body and a top portion of the first valve body, wherein a portion of the hydraulic oil passing through the first valve body flows through the supply oil passage to be supplied to the top portion.

3. The hydraulic oil supply apparatus according to claim 1, further comprising a groove formed at an inner wall surface of the inner void and connecting the first oil passage and a top portion of the first valve body, wherein a portion of the hydraulic oil passing through the first valve body flows through the groove to be supplied to the top portion.

4. The hydraulic oil supply apparatus according to claim 1, wherein an area at which the first inflow bore, the first outflow bore, and the first recess portion face one another decreases when hydraulic pressure of hydraulic oil discharged from the oil pump increases to move the first valve body.

5. The hydraulic oil supply apparatus according to claim 3, wherein an area at which the first inflow bore, the first outflow bore, and the first recess portion face one another decreases when hydraulic pressure of hydraulic oil discharged from the oil pump increases to move the first valve body.

6. The hydraulic oil supply apparatus according to claim 3, wherein the first valve body stops moving at a portion where the hydraulic pressure of the hydraulic oil passing through the first valve body and the hydraulic pressure applied to the top portion of the first valve body are balanced out.

* * * * *